Feb. 25, 1969 J. DENIS 3,430,027
RESISTANCE WELDING MACHINE
Filed April 5, 1966 Sheet 1 of 3
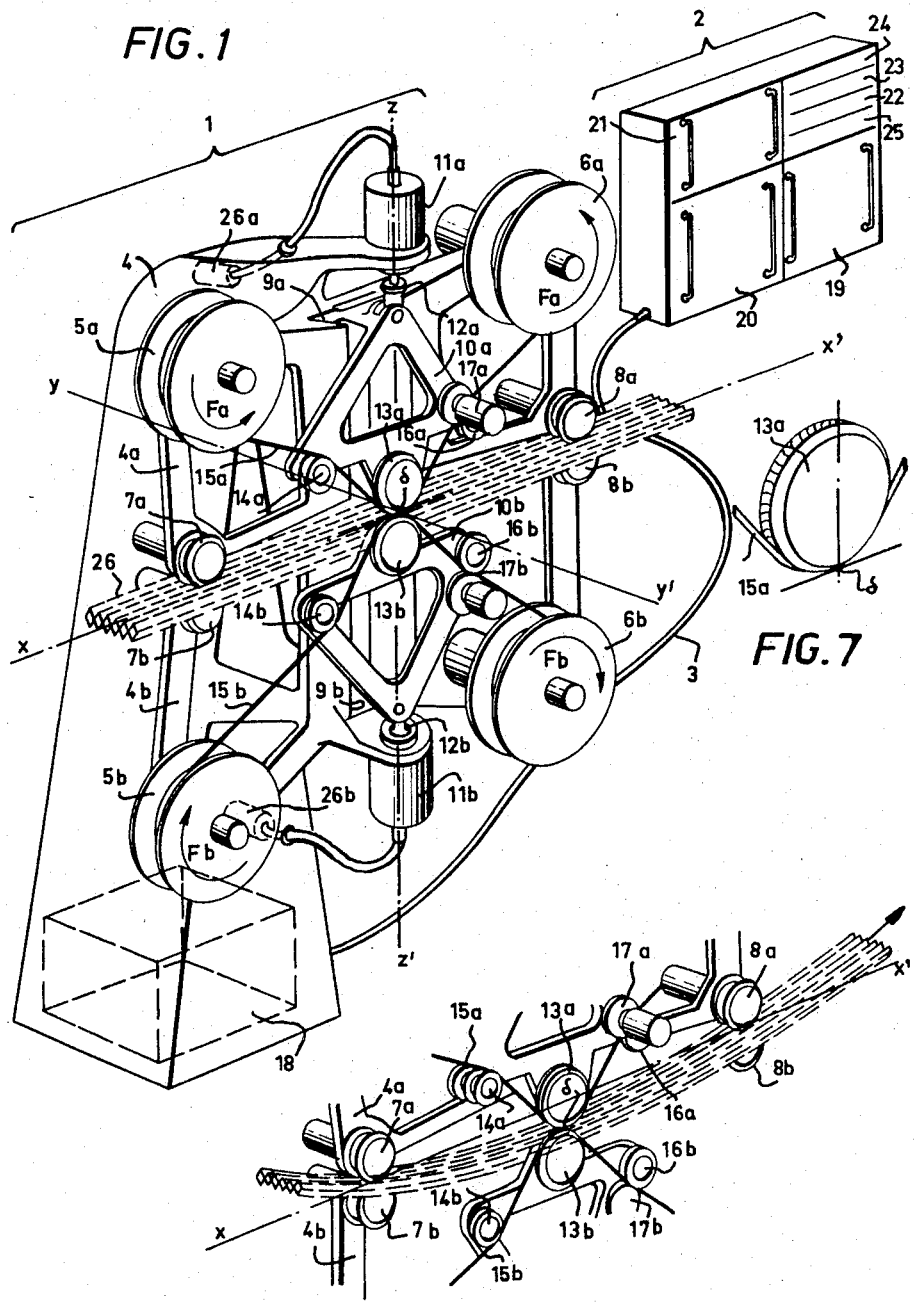
FIG. 1
FIG. 7
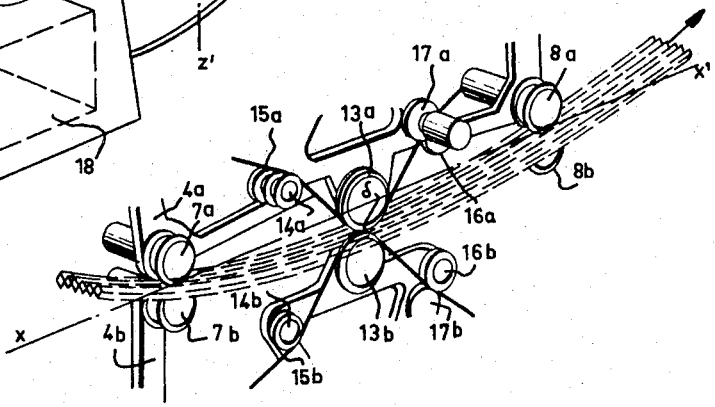
FIG. 6
INVENTOR
Jean Denis
BY Karl W. Flocks
ATTORNEY Feb. 25, 1969   J. DENIS   3,430,027
RESISTANCE WELDING MACHINE
Filed April 5, 1966   Sheet 3 of 3

INVENTOR
Jean Denis

BY Karl W. Flocks
ATTORNEY

United States Patent Office 3,430,027
Patented Feb. 25, 1969

3,430,027
RESISTANCE WELDING MACHINE
Jean Denis, Antony, France, assignor to Nord-Aviation Societe Nationale de Constructions Aeronautiques, Paris, France, a joint-stock company of France
Filed Apr. 5, 1966, Ser. No. 540,281
Claims priority, application France, May 21, 1965, 18,026
U.S. Cl. 219—81  8 Claims
Int. Cl. B23k *11/06, 9/12*

ABSTRACT OF THE DISCLOSURE

A welding machine is provided of the general type which utilizes deformable intermediate wire electrodes which pass about wheels between which the elements to be welded move, the wheels exerting pressure maintaining the elements together for welding. Means are provided which enables the two wires passing over the welding wheels, disposed on opposite sides respectively of the elements to be welded, to be driven at a speed less than the speed of the elements during a non-welding period of time. This reduces the utilization of the wire electrode.

---

The present invention relates to a resistance-welding machine of the kind comprising a deformable intermediate electrode, together with an associated device intended to reduce the utilization of the said electrode.

The method of welding by resistance is in fact known, in which there is interposed between the parts to be welded and the wheel electrodes an intermediate electrode utilized during the course of the process and which is essentially intended to be subjected, instead of the said wheels, to the local deformations due in particular to the pressure cycles occurring during the welding proper. This method thus enables the wheel electrodes, which otherwise would be rapidly rendered useless, to be maintained in good condition.

The application of a method of this kind thus necessitates on the one hand the provision of a certain number of devices permitting in particular a supply and a regulation of the feed of new electrodes, storage for used electrodes, guiding and translation of the parts to be welded, and on the other hand a group of conventional circuits intended to control the welding current cycles, combined with the pressure cycles of the electrodes on the parts to be assembled together.

It is known moreover that the said deformable intermediate electrode can be constituted with advantage by a copper wire selected for its characteristics, or by a wire of any other metal which is a good conductor and capable of withstanding mechanical deformation. In addition, it is known to obtain a succession of welding points by relative displacement of the intermediate element serving as an electrode with respect to the parts to be welded, the welding current being brought to these electrodes by means of the wheels, while the latter serve to transmit the controlled pressure cycles to the parts to be welded.

Such operations thus necessitate a very accurate control of the welding current and the pressure cycles, whereas for the purpose of reducing as far as possible the often costly utilization of the intermediate electrode and of obtaining uniform welding, it is necessary to control strictly the feed of this latter.

The welding machine according to the present invention provides a solution for the above problems.

It has also for its object to ensure:

A curvature of the wire such that the surface of the point of contact may be compatible with the current density applied to the electrode for a given pressure;

A movement of translation in parallel directions of the parts to be welded and the intermediate element;

A mechanical tension of the metal wire constituting the intermediate electrode, which is identical over all the sections of its travel;

A direction of application of the cycles of pressure on the wire which is perpendicular to the direction of movement of the part to be welded;

Easy manipulation for placing in position or removing the intermediate electrode.

To this end, the machine according to the invention is essentially characterized by the fact that it is constituted by the combination:

Of a moving assembly supporting welding wheels, in the grooves of which are applied the intermediate electrodes, this assembly being moved by the action of an operating jack controlled by an electro-valve and permitting the application of pressure cycles;

Of a device permitting the control and operation of the feed of the intermediate electrode;

And of electrical circuits associated with the machine and essentially comprising a welding transformer, a sequence unit, a modulator unit and an operating unit and a control cubicle enabling the operation of the whole of the machine to be controlled.

In accordance with other characteristic features:

Driving rollers are provided on the machine and are intended to control the movements of the parts to be welded.

The control and operating device for the feed of the intermediate electrode comprises a delivery wheel and a receiving wheel, guiding rollers free for rotation, grooves formed in the knurled wheels, and at least one driving roller with variable speed and de-clutchable during the application of the pressure cycles.

According to one form of construction, especially applicable to the welding of thin metal sheets, the machine comprises two main axes of symmetry, vertical and horizontal, the parts to be welded moving in translation along the said horizontal axis between two identical moving assemblies supporting the knurled wheels and each associated with the same device for controlling and regulating the feed of intermediate electrode, the central welding zone being located at the intersection of the vertical axis along which the pressure is applied and the horizontal axis of translation of the parts to be assembled, which coincides with the direction of movement of the intermediate electrodes.

In the particular case of welding incurved parts, the variable-length crank-arms of the operating jacks are brought into a position such that the welding zone is located above or below the horizontal axis.

Other advantages and characteristic features of the present invention will become apparent from the description which follows below, made with reference to the accompanying drawings, in which:

FIG. 1 is a diagrammatic view in perspective of a preferred form of construction of a welding machine in accordance with the invention.

FIG. 6 is a partial view in perspective of the welding machine according to FIG. 1, applied to the welding of incurved parts.

FIG. 7 is a detail view in perspective of one possible form of construction of the knurled wheels employed.

Figure 5:
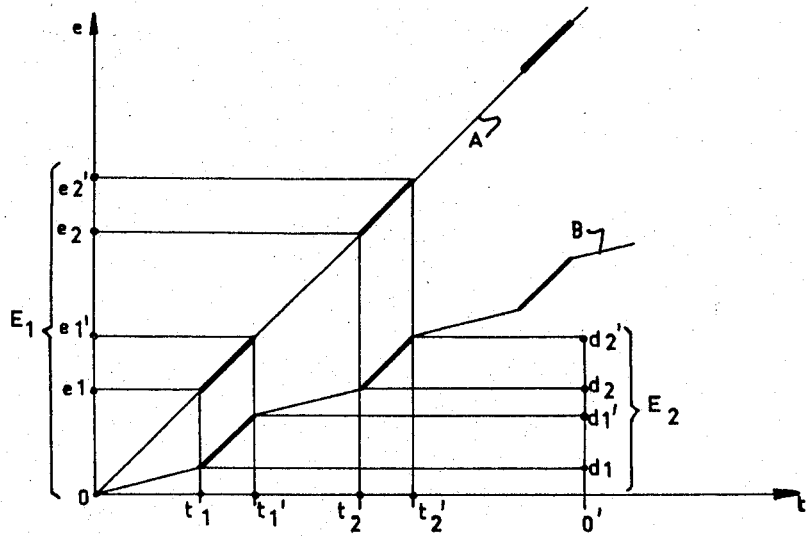
FIG. 5 is a chart intended to show the various possible laws of relative speed between the parts to be welded and the intermediate electrode.

Referring now to FIG. 1, the whole of the welding machine is indicated in a general manner by 1 and is completed by an operating and control cubicle 2 with a connecting cable 3. A rigid frame 4 has two arms which support the two open-work plates 4a, 4b provided at their centres with slideways 9a, 9b in which two slides 10a and 10b respectively are capable of moving. These slides 10a, 10b are equipped respectively with knurled wheels 13a, 13b, in the grooves of which are housed the electrodes 15a, 15b. These latter are advantageously constituted by a metal wire 15a, 15b, wound round feed reels 5a, 5b and receiving reels 6a, 6b and passing successively over the guiding rollers 14a, 14b and then into the grooves of the knurled wheels 13a, 13b and between rollers 16a, 17a and 16b, 17b, the rollers 17a, 17b being driving rollers with magnetic clutches. The whole of the above electrode-carrier device rotates in the direction indicated by the arrows Fa, Fb and which corresponds to that of the travel of the part 26 to be welded.

The slides 10a, 10b are actuated respectively by jacks 11a, 11b controlled in turn by electro-valves 26a, 26b, their travel being regulated by crank-arms 12a, 12b of variable length. The welding machine 1 finally comprises the driving rollers 7a, 7b at the intake and 8a, 8b at the outlet for the part to be welded, which also passes between the knurled wheels 13a, 13b and the electrodes 15a, 15b.

The usual welding transformer 18 has been shown diagrammatically in broken lines and by way of indication.

In the preferred form of construction of the machine according to the invention shown in FIG. 1, the whole of the device is thus symmetrical with respect to the horizontal plane containing the axis $x-x'$, along which is effected on the one hand the translation and the welding of the part 26, and on the other the travel of the electrodes 15a, 15b. This form of construction is advantageously applied to the assembly of thin metal sheets, especially of corrugated sheets which are gripped between the two knurled wheels 13a, 13b and from thence between the two facing electrodes 15a, 15b. In this case, the welding axis $x-x'$ is thus horizontal and the axis $z-z'$ along which the pressure is applied by means of the electrodes 15a, 15b is vertical. The continuous or discontinuous lines of welding are perpendicular to the axis $y-y'$ at right angles to the first two. In consequence, the central welding zone designated by $\delta$ is located at the intersection of the said axes, the displacement of the slides 10a, 10b carrying the knurled wheels 13a, 13b is effected parallel to $z-z'$, the part 26 to be welded moves in the horizontal plane containing the axis $x-x'$ and the travel of the electrodes takes place in the vertical plane formed by the axes $x-x'$ and $z-z'$.

Figure 2:
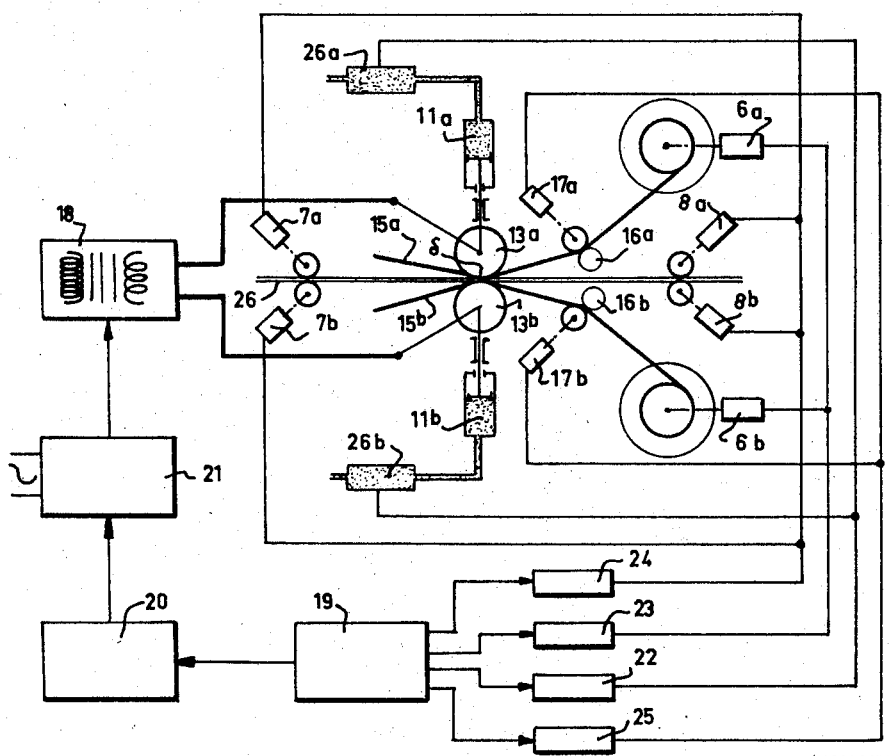
FIG. 2 shows a diagram of the whole of the machine according to FIG. 1 and of the main electrical circuits which are associated therewith, and enables the general operation of the machine during the process of welding to be shown more clearly.

The operating and control cubicle 2 can comprise, as has been shown diagrammatically in FIGS. 1 and 2, a sequence unit 19, a modulator unit 20, an operating unit 21 and four panels 22, 23, 24 and 25 intended for the control respectively of the electro-valves, the mechanical tension of the electrodes 15a, 15b, the movement of the part 26 to be welded and the speed of travel of the electrodes 15a, 15b.

Figure 3:
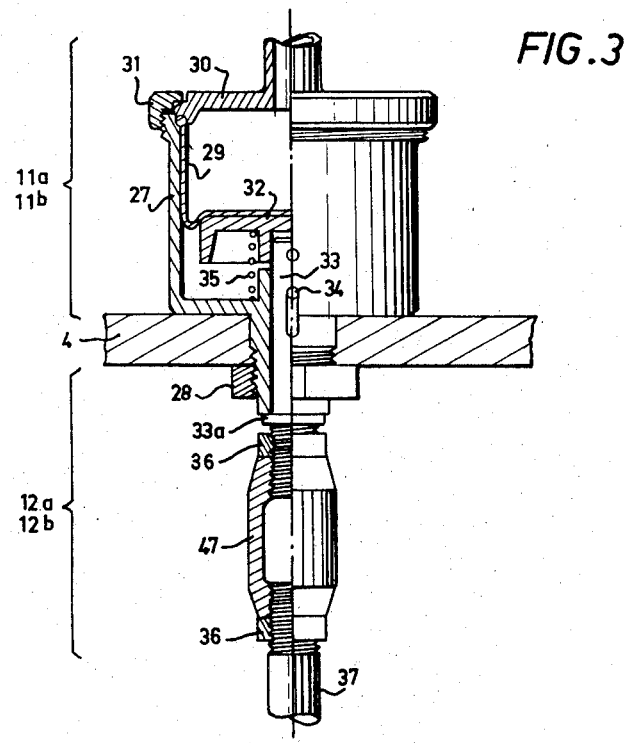
FIG. 3 is a partial view in half-section of one possible form of construction of the operating jack employed in the machine according to the invention, and of the coupling rod controlling the movements of the moving part which supports the knurled wheel carrying the electrode.

In one possible form of construction, the jacks 11a, 11b shown in more detail in FIG. 3, comprise a fixed portion including essentially a body 27, a cover 30, a closure nut 31 and a moving portion actuated through the intermediary of the elastic diaphragm 29 and constituted by a piston 32 coupled to a shaft 33 housed in a spring 35; rotation of the shaft 33 is prevented by means of a stud 34. The jacks 11a, 11b are fixed to the frame 4 by nuts 28. On the other hand, as also shown in FIG. 3, the crank-arms 12a, 12b of adjustable length, each comprise a nut 33a with a reversed thread screwed on the one hand on the shaft 33 and on the other on the shaft 37, displacing the slide 10a or 10b.

Two lock-nuts 36, 36 lock the nut 47 in the selected position.

Figure 4:
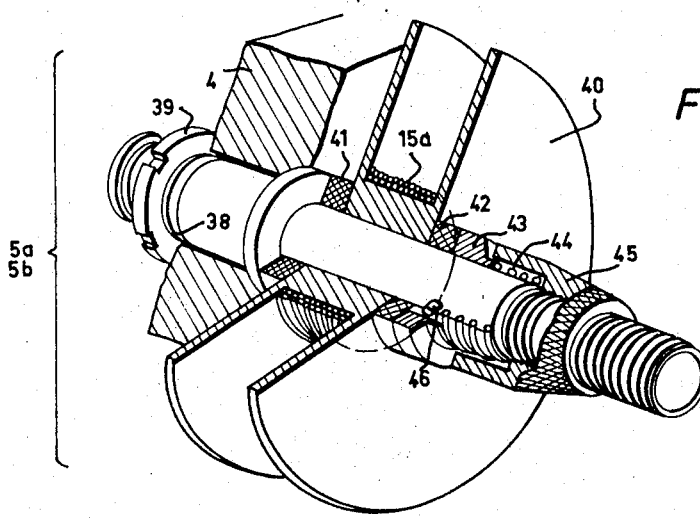
FIG. 4 shows in perspective, along a partial axial section, a possible form of construction of a feed reel provided with a mechanism for regulating the tension of the wire which constitutes the electrode.

One form of possible construction of a feed-reel 5a, 5b for the electrode and of its associated mechanism is shown in FIG. 4. In this figure, a fixed shaft 38 is rigidly secured to the frame 4 of the machine 1 by means of the nut 39. The reel 40 receives the electrode 15a between its two plates. It is braked by means of the assembly constituted by the two friction rings 41, 42, the supporting ring 43 and the spring 44, the length of which is adjusted by the threaded knob 45. A stud 46 prevents rotation of the ring 43.

The mounting of the receiving reels 6a, 6b is similar to that described above for the reels 5a, 5b, taking into account the fact that only the first are driven in rotation.

The operation of the whole unit is therefore as follows:

During the unwinding of the unused electrode or wire 15a, 15b coming from the feed-reels 5a, 5b, this wire, after passing over the rollers 14a, 14b and then over the grooved wheels 13a, 13b by means of which it is deformed and used, and finally over the rollers 16a, 16b and 17a, 17b, is wound on the receiving reels 6a, 6b. The adjustment of the mechanical tension of the wire and that of its unwinding speed are effected by means of the threaded knob 35 referred to above and by the adjustment of the driving speed of the receiving reels 6a, 6b.

In addition, the jacks 11a, 11b controlling the displacements, often of small amplitude, necessary for the application of pressure to the parts to be assembled through the intermediary of the electrodes 15a, 15b can operate with relatively high frequencies by reason of their high sensitivity. These frequencies are obtained by the opposing action, on the one hand of air pulsations acting on the diaphragm 29 and, on the other hand of the thrust of the spring 35.

The welding machine described above also makes it possible to carry out either welding in continuous lines, that is to say in which the welding points practically overlap, or a discontinuous welding, that is to say at separate points.

In the first case, the distance separating two imprints or applications of pressure on the intermediate electrode is a minimum and the speed of travel of the electrodes 15a, 15b and of the parts to be welded can be identically the same. Such a law of operation is shown by curve A of the diagram of FIG. 5, in which the time $t$ has been plotted in abscissae and the distances or intervals in ordinates.

In the second case, it is also possible to give the same speed of travel to the electrode and the part to be welded while proceeding to the periodic application of welding impulses. However, when, for the purpose of reducing the utilization of the electrode constituted by a wire for example, it is desired to reduce the distance between two successive imprints on the electrode, it is sufficient, during the space of time corresponding to the said distance, to bring the speed of travel of the electrode to a value less than the speed of lateral movement of the part to be welded.

More precisely, and making reference to the curve B of the diagram of FIG. 5, between the instants O and $T_1$, the distance travelled by the electrode $O'd_1$ in the case of operation of the machine with reduction of utilization of the electrode; this distance, corresponding to a consumed length, is less than that of the $Oe_1$ determined on curve A during the course of the same time interval $O-t_1$ of non-welding, in the case where the two speeds are identical. On the same curves, the interval $t_1-t'_1$ corresponds to the period of welding during which, by reason of the identical speed of travel of the electrode and the part, the lengths $d_1$–$d'_1$ on the curve B and $e_1$, $e'_1$ on curve A are identical if it is assumed that the period of welding is the same in both cases. At the end of a certain time of operation, $t'_2$, the length $E_2$ of electrode employed during the operation following the second law will be less than the length $E_1$ of electrode which would be utilized following the first law illustrated by curve A.

From the practical aspect, and referring particularly to the diagram of FIG. 2 as well as the diagram of FIG. 5, between the instants O and $t_1$, the knurled wheels 13a and 13b have released their pressure on the parts to be assembled shown at 26 and, while these latter are driven and guided by the rollers 7a, 7b, and 8a, 8b, the electrodes 15a, 15b unwind under the action of the rollers 17a, 17b which drive them, the length unwound being absorbed by the receiving reels 6a, 6b. Between the instants $t_1$ and $t'_1$ corresponding to the period of welding, the parts 26 are always moved at the same speed; however, at the instant $t_1$, the jacks 11a, 11b under the impulsion of the electro-valves 26a, 26b which are in turn controlled by the sequence unit 19, apply the knurled wheels 13a, 13b under pressure against the parts 26; under the action of the movement of the parts 26, these wheels then drive the electrodes 15a, 15b which for this reason no longer require the driving action of the rollers 17a, 17b, which are de-clutched at that instant.

In addition, at the same instant $t_1$, the modulator unit 20 sends to the operating unit 21 the beginning of the electrical welding impulse sent to it by the welding transformer 18, so as to be applied to the knurled wheels 13a, 13b and transmitted to the electrodes 15a, 15b.

During the entire period $t_1$–$t'_1$, any type of current-pressure modulation can be utilized as necessary for the correct operation of the process of welding, all the operations forming part of the welding cycle having been previously programmed in the sequence unit. At the instant $t'_1$, the system returns to its initial condition at the instant O and the various operations continue automatically.

In FIG. 6, there has been shown partially the same machine as in FIG. 1, applied according to the invention to the welding of curved parts.

In this figure, the slides 10a, 10b are moved by means of the adjustable crank-arms 12a, 12b into a position such that the central welding zone δ is located either above or below, as in FIG. 6, the horizontal axis $x$–$x'$. In this case, it is clear that the rollers 7a, 7b and 8a, 8b must be adapted to the shape of the parts to be welded.

It will of course be understood that the present invention has been described and shown only by way of pure explanation and without any limitation and that any alternative form may be given to it without thereby departing from its scope.

I claim:
1. A resistance welding machine comprising at least one mechanically-deformable intermediate electrode, such as a conductive metal wire, by means of which the necessary mechanical pressure is applied and the welding current is passed, said machine comprising essentially:
   two identical electro-mechanical assemblies movable in the same vertical plane along a main vertical axis of symmetry for said machine, the parts to be welded being displaced in lateral movement along a horizontal axis of symmetry of the machine, between said two movable electro-mechanical assemblies;
   at least one knurled welding wheel carried respectively by each movable electro-mechanical assembly and in the grooves of which respectively passes an intermediate electrode;
   and for each of the two said assemblies of the machine:
      an operating jack, controlled by an electro-valve, for actuating said electro-mechanical assembly supporting the welding wheels thereby causing the application of pressure cycles during the welding periods;
      means for regulating and controlling the speed of travel of said intermediate electrode;
      means for driving and guiding the parts to be welded in lateral movement;
      and an electrical circuit for supplying welding current to said machine in relation to the method of operation and the pressure cycle previously chosen.

2. A resistance welding machine as claimed in claim 1, in which the said parts to be welded are essentially constituted by thin sheets.

3. A resistance welding machine comprising at least one mechanically-deformable intermediate electrode, such as a conductive metal wire, by means of which the necessary mechanical pressure is applied and the welding current is passed, said machine comprising essentially:
   two identical electro-mechanical assemblies movable in the same vertical plane along a main vertical axis of symmetry of said machine, the parts to be welded being displaced in lateral movement along a horizontal axis of symmetry of the machine, between said two movable electro-mechanical assemblies;
      at least one welding wheel carried respectively by each movable electro-mechanical assembly and in the grooves of which respectively passes an intermediate electrode;
   and for each of said two assemblies of the machine:
      an operating jack, controlled by an electro-valve, for actuating said electro-mechanical assembly carrying the welding wheels thereby causing the application of pressure cycles during the welding periods;
      a mechanical unit for regulating and controlling the speed of said intermediate electrode, comprising essentially a feed reel and a receiving reel, guiding rollers, and at least one driving roller with variable speed and provided with a magnetic clutch;
      means for driving and guiding the parts to be welded in lateral movement;
      and an electrical circuit for supplying welding current to said machine in relation to the method of operation and the pressure cycle previously chosen.

4. A resistance welding machine as claimed in claim 3, in which said feed reels for said intermediate electrode are respectively provided with an adjustable friction-braking mechanism so as to permit, in combination with the regulation of the speed of rotation of the feed and receiving reels, the regulation of the mechanical tension of said intermediate electrode.

5. A resistance welding machine comprising at least one mechanically-deformable intermediate electrode, such as a conductive metal wire, by means of which the necessary mechanical pressure is applied and the welding current is passed, said machine comprising essentially:
   two identical electro-mechanical assemblies movable in the same vertical plane along a main vertical axis of symmetry of said machine, the parts to be welded being displaced laterally along a horizontal axis of symmetry of the machine, between the two said movable electro-mechanical assemblies;
   at least one welding wheel carried respectively by each of said movable electro-mechanical assemblies, and in the grooves of which passes respectively an intermediate electrode;
   and for each of the two said assemblies of the machine:
      an operating jack, controlled by an electro-valve, for actuating said electro-mechanical assembly carrying the welding wheels thereby causing the application of pressure cycles during the welding periods;

a mechanical unit for regulating and controlling the speed of said intermediate electrode, comprising essentially a feed reel and a receiving reel, guiding rollers, and at least one driving roller with variable speed and provided with a magnetic clutch so that during the application of the pressure cycles the driving rollers of the intermediate electrode are de-clutched, said electrode then moving at the same speed as the parts to be welded due to the action of the welding wheels, while during the periods of non-welding, the speed of travel of the intermediate electrode imparted by said driving rollers is less than the speed of lateral movement of the parts to be welded;

means for driving and guiding the parts to be welded in lateral movement;

and an electrical circuit for supplying welding current to said machine in relation to the method of operation and the pressure cycle previously chosen.

6. A resistance welding machine as claimed in claim 5, in which the electrical circuit associated with said machine comprises at least a welding transformer, a sequence unit, a modulator unit, an operating unit and a control cubicle enabling the operation of the whole of the machine to be controlled.

7. A resistance welding machine comprising at least one mechanically-deformable intermediate electrode, such as a conductive metal wire, by means of which the necessary mechanical pressure is applied and the welding current is passed, said machine comprising essentially:

two identical electro-mechanical assemblies movable in the same vertical plane along a main vertical axis of symmetry of said machine, the parts to be welded being displaced in lateral movement along a horizontal axis of symmetry of the machine, between the two said movable electro-mechanical assemblies;

at least one welding wheel carried respectively by each of said movable electro-mechanical assemblies and in the groove of which respectively passes an intermediate electrode;

and for each of the two said assemblies of the machine:

an operating jack, controlled by an electro-valve, for actuating said electro-mechanical assembly carrying the welding wheels thereby causing the application of pressure cycles during the welding periods;

a mechanical unit for the regulation and control of the speed of said intermediate electrode, comprising essentially a feed-reel and a receiving reel, guiding rollers, and at least one variable-speed driving roller provided with a magnetic clutch, so that during the application of the pressure cycles the driving rollers acting on the intermediate electrode are de-clutched, this latter then moving at the same speed as the parts to be welded due to the action of the welding wheels, while during the non-welding periods, the speed of travel of the intermediate electrode communicated by the driving rollers is less than the speed of lateral movement of the parts to be welded;

pairs of driving rollers arranged symmetrically at the intake and the outlet of said machine so as to drive and guide said parts to be welded in their lateral movement;

and an electrical supply and control circuit for supplying current to said machine and comprising essentially:

a welding transformer, a sequence unit, a modulator unit, an operating unit and a control cubicle permitting the operation of the whole of the machine to be controlled.

8. A resistance welding machine as claimed in claim 7, in which the parts to be welded are constituted by incurved surfaces, the variable-length crank-arm of each of the operating jacks being adjusted in such manner that the welding zone is located outside the main horizontal plane of symmetry of the machine.

References Cited

UNITED STATES PATENTS

| | | | |
|---|---|---|---|
| 1,267,400 | 5/1918 | Gravell | 219—119 |
| 1,300,603 | 4/1919 | Gravell | 219—81 |
| 1,308,778 | 7/1919 | Gravell | 219—82 |
| 2,078,006 | 4/1937 | Lockwood | 219—81 |
| 2,200,887 | 5/1940 | Lockwood | 219—119 |
| 3,015,713 | 1/1962 | Eckler et al. | 219—81 X |

FOREIGN PATENTS

| | | |
|---|---|---|
| 571,401 | 8/1945 | Great Britain. |

RICHARD M. WOOD, *Primary Examiner.*

BARRY A. STEIN, *Assistant Examiner.*

U.S. Cl. X.R.

219—119